(12) United States Patent
Swope et al.

(10) Patent No.: US 7,280,936 B1
(45) Date of Patent: Oct. 9, 2007

(54) METHOD AND SYSTEM FOR PERSONAL INERTIAL NAVIGATION MEASUREMENTS

(75) Inventors: Charles B. Swope, Coral Springs, FL (US); Daniel A. Tealdi, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/379,602

(22) Filed: Apr. 21, 2006

(51) Int. Cl.
*G01C 9/00* (2006.01)
*G01C 17/00* (2006.01)
*G01C 19/00* (2006.01)
*G06F 15/00* (2006.01)

(52) U.S. Cl. .................................... 702/151
(58) Field of Classification Search ................. 702/151
See application file for complete search history.

(56) References Cited

U.S. PATENT DOCUMENTS 5,831,937 A * 11/1998 Weir et al. ................... 367/128
6,459,990 B1 * 10/2002 McCall et al. .............. 701/220

OTHER PUBLICATIONS

"A Non-Traditional High Performance Broad-Band Seismometer," Apr. 30, 2004, Moscow Institute of Physics and Technology, Russia (http://www.iris.edu/stations/seisWorkshop04/PPT/MIPT.ppt, viewed on Dec. 21, 2006).*

* cited by examiner

*Primary Examiner*—John Barlow
*Assistant Examiner*—Lisa Sievers

(57) ABSTRACT

A system (400, 500) and method (800) of personal inertial navigation measurements can include measuring (802) an angle, measuring (804) an angular velocity independent of an angle measurement, measuring (806) an angular acceleration independent of the angle measurement and independent of an angular velocity measurement, and combining (808) the angle measurement, the angular velocity measurement, and an angular acceleration to provide an angled output. The angle measurement can be measured using a compass or magnetic field, the angular velocity can be measured using a gyroscope (such as a MEMS gyroscope), and the angular acceleration measurement can be measured using an angular accelerometer (such as a molecular electronic transfer device having a magneto hydrodynamic effect device). The method can further include suppressing (810) noise caused by the angle measurement by using a sample and hold circuit (504) controlled by a higher ordered component to suppress noise from a lower ordered component.

15 Claims, 5 Drawing Sheets

METHOD AND SYSTEM FOR PERSONAL INERTIAL NAVIGATION MEASUREMENTS

FIELD OF THE INVENTION

This invention relates generally to communication and location technologies, and more particularly to a method and system of location technology using an angular acceleration sensor.

BACKGROUND

Analogous to position, velocity, and acceleration in normal "linear" motion where the derivative of position gives velocity and the derivative of velocity gives acceleration, angular motion can be determined in much the same way. Instead of position, velocity, and acceleration, there is angle, angular velocity, and angular acceleration. One can be derived from the other by the same mathematical functions in that the derivative of angle gives angular velocity, and the derivative of angular velocity gives angular acceleration. It is also understood that the inverse function of taking the derivative is to integrate (or integration).

In an ideal world, a single sensor can be used for one of the variables such as for angular velocity and then arrive to angle or angular acceleration by just doing the appropriate derivative or integration function. Since the world is not ideal in this regard, there are factors that affect and significantly degrade the ability to derive one parameter from another one. Noise, sampling rate, dynamic range, offsets, temperature drifts, etc. (other drifts) can cause such significant degradation. These derivation techniques are used today in some very high cost applications such as precision mine surveying, space navigation, and missile guidance, but such techniques are overwhelmingly affected for use in low cost applications.

Traditional inertial navigation systems (INS) include a collection of technologies that either provide direct measures or perform mathematical operations on sensor data to yield static angle, velocity (or rate), and acceleration, for use in a navigation computer to derive position. In the most advanced systems, there are a collection of sensors that provide linear acceleration, angular rate, and bearing. Sensors fail to exist that provide very accurate angular acceleration measures and hence need to be derived from the derivative of an angular rate sensor (gyroscope). Because of this, the error in the gyroscope is accumulated through the navigation computations. Existing INS technology is not small enough, light enough and cheap enough to embed or work with subscriber portable radios such as cellular phones or other portable consumer products.

SUMMARY

Embodiments in accordance with the present invention make use of at least three (3) sensors. Furthermore, some embodiments are made practical today due to advances in MEMS technology. The three sensors can include one for angle, one for angular velocity, and one for angular acceleration instead of one or two expensive sensors. The reason this is not trivial, while in concept it may seem so, is that each of the sensors do not work in the same manner and therefore are subject to errors and perturbations that come from different sources. For example, angle sensors used today rely on the earth's magnetic field. These sensors are prone to make inaccurate readings if used in an environment where there is a magnetic field perturbation, for example a place with large motors running, close to large metallic objects such as cars, and the like. Today there is no other means of directly sensing angle for these types of portable applications (for example a person on foot). Angular velocity and acceleration sensors use inertial properties to detect and measure the angular displacement due to acceleration or velocity. While they both work in a similar manner, the precision of the sensor and its noise characteristic does not allow them to readily be used to derive or integrate its signal without a penalty in error accumulated.

While the angular sensor can not simply be used to generate the other two parameters, the output of three separate sensors can be combined and, thus, minimize their error and achieve an improvement in performance. This effectively allows the use of three different and independent sensors to achieve levels of accuracy that today can only be achieved with high cost devices dedicated to military and aerospace industry.

In a first embodiment of the present invention, a method of personal inertial navigation measurements can include the steps of measuring an angle, measuring an angular velocity independent of an angle measurement, measuring an angular acceleration independent of the angle measurement and independent of an angular velocity measurement, and combining the angle measurement, the angular velocity measurement, and an angular acceleration to provide an angled output. The angle measurement can be measured using a compass or magnetic field, the angular velocity can be measured using a gyroscope (such as a MEMS gyroscope), and the angular acceleration measurement can be measured using an angular accelerometer (such as a molecular electronic transfer device having a magneto hydrodynamic effect device). The method can further include the step of suppressing noise caused by the angle measurement by using a sample and hold circuit controlled by a higher ordered component to suppress noise from a lower ordered component where devices for measuring angle, angular velocity, and angular acceleration are ordered in ascending order.

In a second embodiment of the present invention, a personal inertial navigation device can include an angle measuring device for measuring an angle, an angular velocity measuring device for measuring angular velocity, an angular acceleration measuring device for measuring angular acceleration, and a combiner for combining the angle measurement, the angular velocity, and an angular acceleration to provide an angled output. Note, each of the measurements can be independently measured. The angle measuring device can be a compass, the angular velocity measuring device can be a gyroscope, and the angular acceleration device can be angular accelerometer. The angular acceleration measuring device can be a molecular electronic transfer device having an electrochemical motion sensor transducer in a housing having an electrolyte channel, mesh anodes and cathodes separated by microporous spacers, wherein the motion of an electrolyte fluid within the electrolyte channel is measured using convective diffusion of ions in the electrolyte fluid such as that provided by Met Technologies. In another variant, the angular acceleration measuring device can be a molecular electronic transfer device and the molecular electronic transfer device can include a electrochemical motion sensor transducer in a housing having an electrolyte channel, and a MEMS pump, wherein the MEMS pump is designed to pump electrolyte fluid at a constant flow rate and the measure of angular acceleration is based on energy used by the MEMS pump required to maintain the electrolyte fluid at the constant flow rate. The angular acceleration measuring device can be a molecular electronic transfer device having a magneto hydrodynamic effect device. The personal inertial navigation device can further include a noise suppressor for suppressing noise caused by the angular velocity measuring device, where an output of the angular velocity measuring device is controlled by a sample and hold circuit using the angular acceleration measuring device to suppress noise caused by the angular velocity measuring device.

In a third embodiment of the present invention, an electronic device including a device for personal inertial navigation measurements can include a plurality of sensors including sensors for measuring angles, angular velocity, and angular acceleration, and a processor coupled to the plurality of motion sensors. The processor can be programmed to measure an angle, measure an angular velocity independent of an angle measurement, measure an angular acceleration independent of the angle measurement and independent of an angular velocity measurement, and combine the angle measurement, the angular velocity measurement, and an angular acceleration to provide an angled output. The electronic device can further include a transceiver coupled to the processor. The electronic device can further include a summing device that combines the angle measurement component, angular velocity measurement, and an angular acceleration measurement. As noted above, the sensor for measuring angles can be a compass, the sensor for measuring angular velocity can be a gyroscope, and the sensor for measuring angular acceleration can be an angular accelerometer using a molecular electronic transfer device. Further note, the processor can be further programmed to suppress noise caused by the angular velocity measuring device by controlling an output of the angular velocity measuring device with a sample and hold circuit using an output of the angular acceleration sensor as an input to the sample and hold circuit.

Other embodiments, when configured in accordance with the inventive arrangements disclosed herein, can include a system for performing and a machine readable storage for causing a machine to perform the various processes and methods disclosed herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "suppressing" can be defined as reducing or removing, either partially or completely.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

DETAILED DESCRIPTION OF THE DRAWINGS

Figure 1:
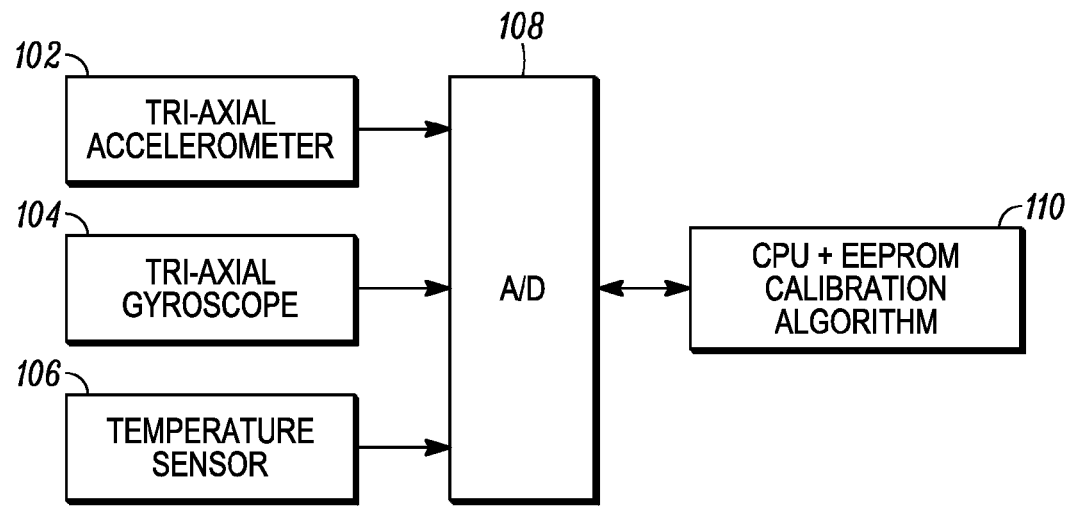
FIG. 1 is an illustration of an inertial navigation system (INS) using a triaxial accelerometer, a tri-axial gyroscope, and a temperature sensor coupled to an analog-to-digital converter and a processor in accordance with the prior art.

While the specification concludes with claims defining the features of embodiments of the invention that are regarded as novel, it is believed that the invention will be better understood from a consideration of the following description in conjunction with the figures, in which like reference numerals are carried forward.

A microelectromechanical system (MEMS) gyroscope, available from several manufacturers, has good instantaneous performance, and low cost, but is not navigation grade having between 100-300 deg/hr drift. A ring laser gyroscope (RLG), with slightly larger size, is still not small enough for portable subscriber devices and is very costly. Molecular Electronic Transducer (MET) Technologies, Inc. provides a transducer which is_low cost, small, and inexpensive by integrating an ionic transducer in a MEMS micro channel with capacitive feedback to provide low drift angular acceleration. In accordance with the present invention, there is provided herein a unique integration of the MET sensor with a high drift, low cost, gyroscope which results in a low drift technology for both angular acceleration and gyroscope sensors. This combination can take a significant burden off of the gyroscope manufacturing process, and allows the use of typical automotive sensors. The combination of zero-order, first-order, and second order sensors can achieve the performance for consumer and portable subscriber products while maintaining a lightweight, small size and low cost product.

Figure 2:
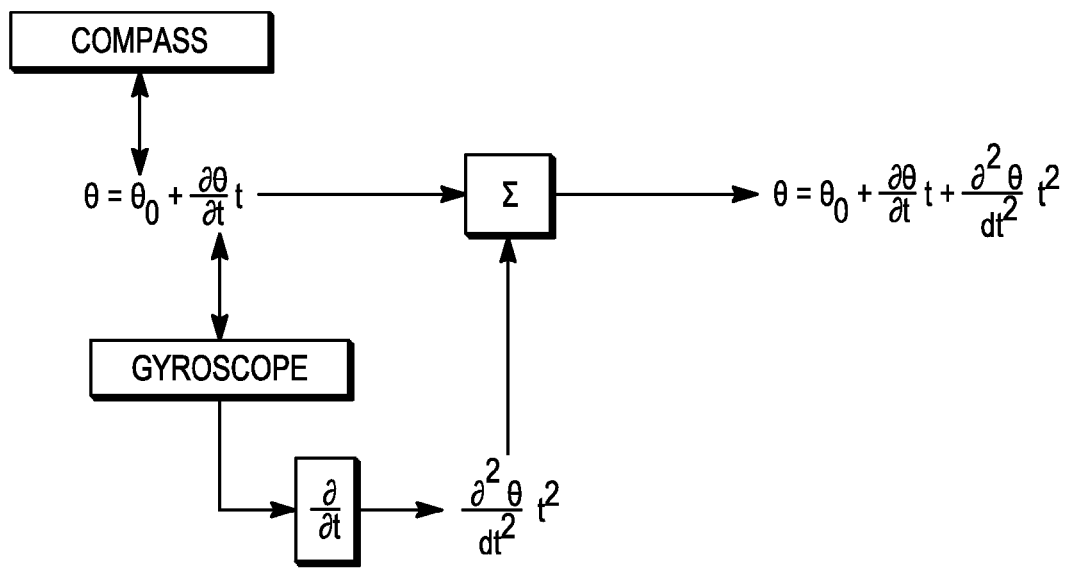
FIG. 2 is an illustration representing implementation mechanics of an equation used to two independent functions of a navigation device where an angular acceleration component is derived or calculated from the angular velocity sensor in accordance with the prior art.

Referring to FIG. 1, a classical implementation of an INS system 100 is illustrated including a tri-axial accelerometer 102, a tri-axial gyroscope 104, and temperature sensor 106 coupled to an analog-to-digital converter 108 and a processor 110 in accordance with the prior art. Each set of sensors gives a unique type of information that can be considered orthogonal to the nature of the other sensors. There are no linear components measured by the gyroscope and no rotational components measured by the accelerometers. Correspondingly, in FIG. 2, an equation 200 known in the prior art uses two different sensors that provide related information (orientation/rotation information). In this equation, the compass provides a zero-order component (theta zero), while the gyroscope provides the first-order component (d(theta)/dt). Note that the gyroscope component must be further derived in order to estimate a second-order component (acceleration) required to arrive to an angular position or orientation.

Figure 3:
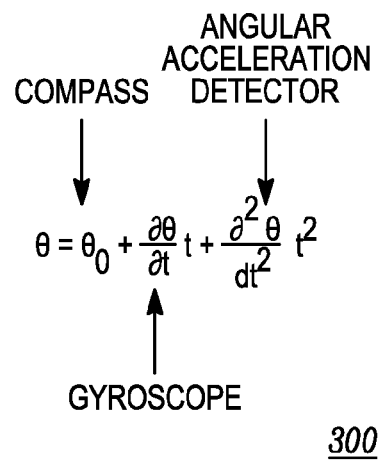
FIG. 3. is a formulaic representation that replaces the process of estimating the second order component (acceleration) by using an angular accelerometer in accordance with an embodiment of the present invention.
Figure 4:
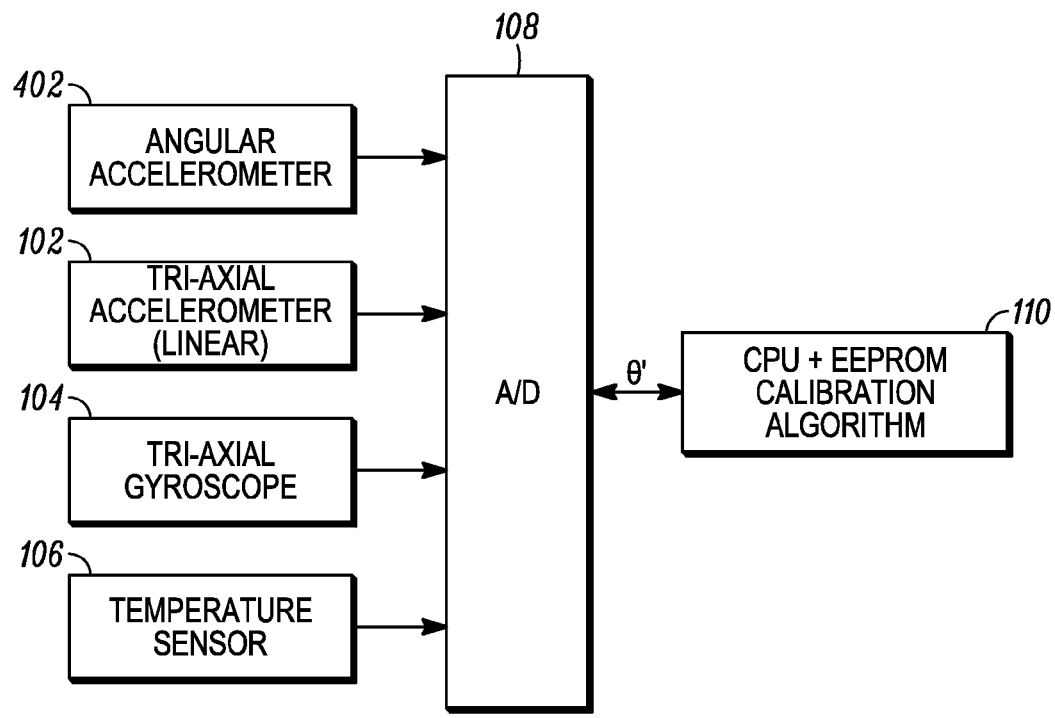
FIG. 4 is an illustration of an inertial navigation system (INS) using a triaxial accelerometer, a tri-axial gyroscope, an angular acceleration sensor coupled to an analog-to-digital converter and a processor in accordance with the present invention.

In accordance with the present invention, FIG. 3 shows an equation that replaces the process of estimating the second-order component (acceleration) by using a newly developed angular accelerometer, such as the one developed using MET technology. This additional sensor shown in FIG. 4 as angular acceleration sensor 402 removes the uncertainty and errors introduced in the integration process (as seen in the equation 200 of FIG. 2) to estimate the second-order component from the first-order measurement. In this case, each of the three motion detection components 402, 102 and 104 is measured with a dedicated sensor, minimizing overall errors.

Figure 5:
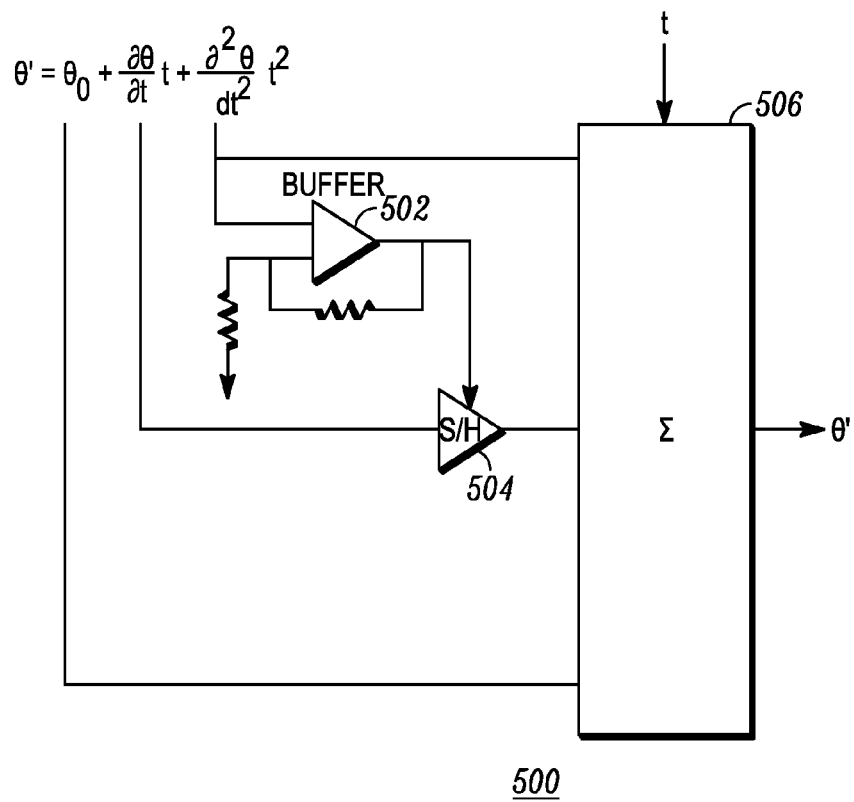
FIG. 5 is an implementation of the equation of FIG. 3 where errors are further reduced by minimizing noise caused by a first order gyroscope sensor in accordance with an embodiment of the present invention.

In the modified equation 300, and as further illustrated in the diagram 500 of FIG. 5, a novel implementation of the equation where errors are further reduced by minimizing the noise caused by the first order gyroscope sensor is illustrated in accordance with an embodiment of the invention. In order to reduce the noise from the first order gyroscope sensor, the angular accelerometer (second-order component) via a buffer 502 is used to determine when there is an appreciable rotational motion by managing a sample-and-hold (S/H) circuit 504. For the cases where the unit is stationary, the derived or calculated orientation/rotation is not affected by the inherent noise of the gyro sensor (drift), only the compass and angular accelerometer data is updated. The estimated error reduction from overall drift will be reduced to the best performing technology. This allows the use of technology that performs at 150 deg/hr to be used in applications that require less than 3 deg/hr sensors. This combination of technologies provides a low cost, small, accurate gyroscope for use in personal navigation having similar accuracy to that of a more expensive ring laser gyroscope (RLG). The three angular measurements are combined using a summing device or processor 506.

There are three distinct types of gyroscopes (gyro) that have unique characteristics that have evolved over time based on their use cases. There are traditional mechanical gyros that are large, accurate, and expensive. There are Laser Ring Gyros (of various forms), that are precise and smaller than mechanical gyros, but too large for portable devices, and expensive. There are the more modern MEMS gyroscopes that are small, inexpensive, but inaccurate for navigation.

Figure 6:
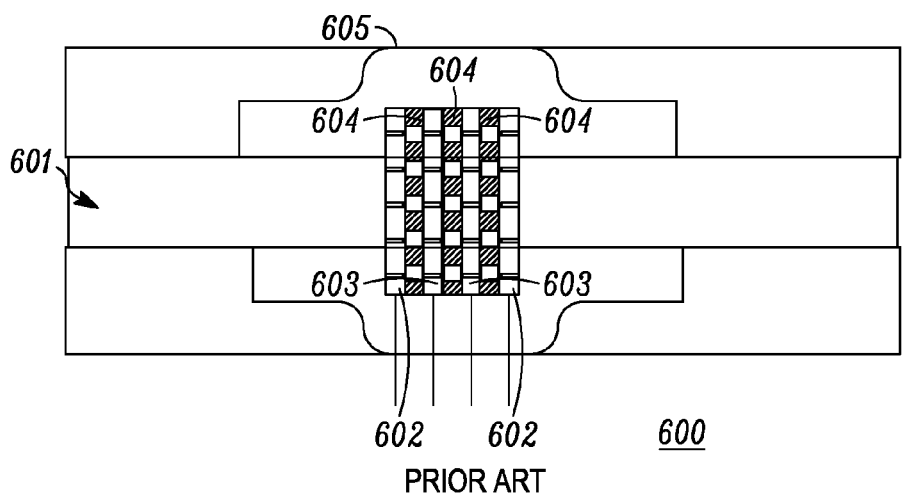
FIG. 6 is a molecular electronic transducer (MET) in accordance with the prior art.

FIG. 6 shows a hydrodynamic sensor 600, such as developed by MET Tech, Inc. and possibly others, in accordance with the prior art. Embodiments herein can utilize hydrodynamic behavior with MEMS closed-loop pumps to provide an ultra low cost, accurate, and small (or ultra small) gyroscope. The MET transducer can include an electrolyte channel 601, a plurality of platinum mesh anodes 602 and cathodes 603, a plurality of microporous spacers 604 and a housing 605 as illustrated.

Figure 7:
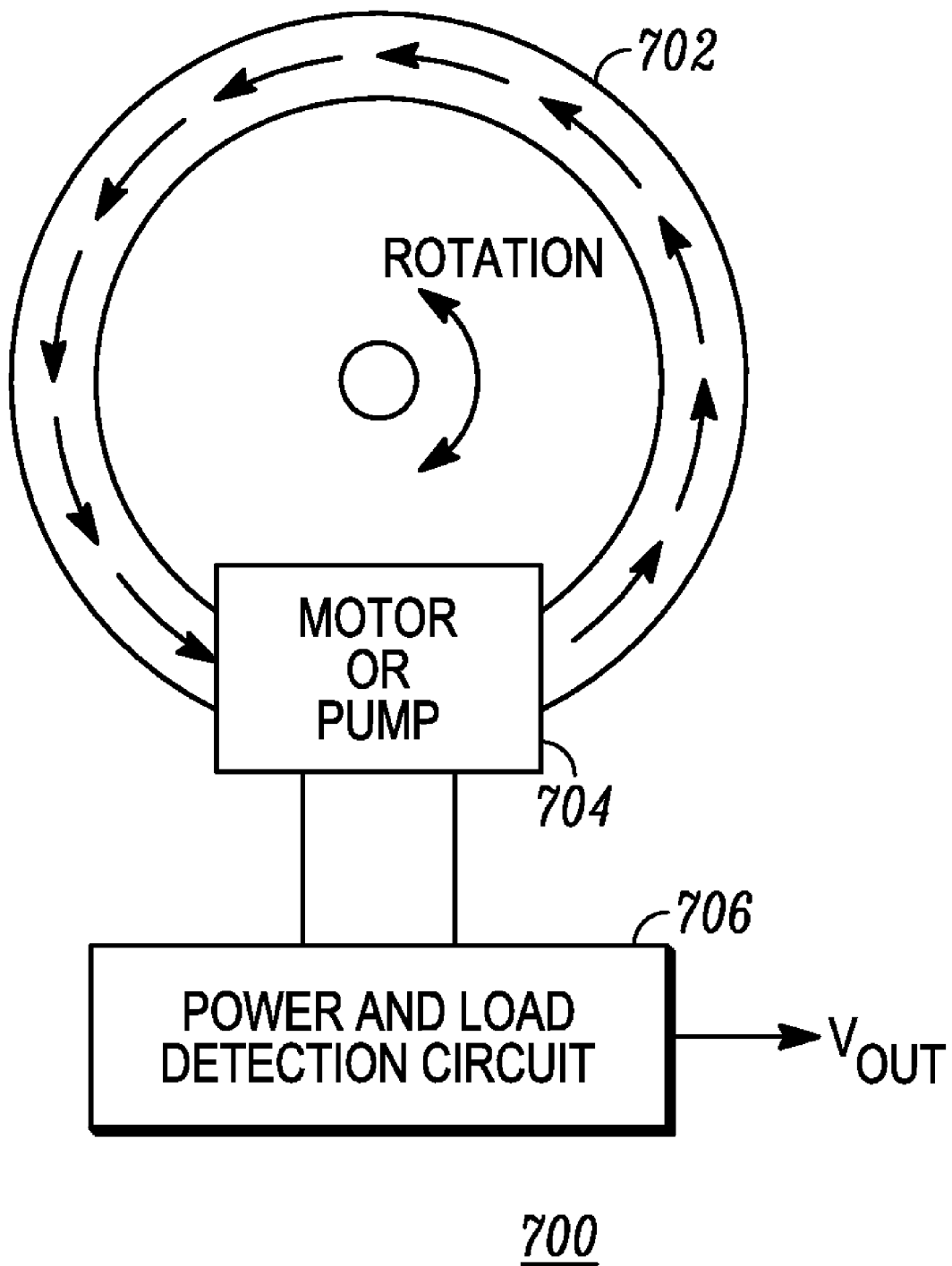
FIG. 7 is an illustration of a hydrodynamic flow sensor in accordance with an embodiment of the present invention.

Significant work continues to be done in the area of MEMS technologies, including the development of MEMS switches and pumps (for use in fuel cells and medical equipment). FIG. 7 shows a cross section of a novel hydrodynamic flow sensor 700 with a clear channel 702 that provides a measure of rotation rate. Device 700 utilizes a "closed loop" integration of a MEMS pump or motor 704 in a micro hydrodynamic channel 702 filled with a non-interfering liquid (such as distilled water, or potassium solution, or butane). During motionless conditions, with the rotation axis perpendicular to the earth's rotation axis, the MEMS pump 704 can consume a fixed, constant, amount of energy to start the channel flow and maintain it. As the micro channel with pump rotates, the amount of energy used to maintain the flow will be proportional to the direction of rotation. If the micro channel rotates along the flow, there is less power needed to maintain flow and vise versa. The amount of energy is measured and converted to angular acceleration rate using a power and load detection circuit 706 for example. The accuracy is a function of the pump dynamics which can be empirically determined. Additional low cost flow sensors can also be used to detect flow to as low as 3.6 uL/sec to provide feedback in closed loop feedback systems.

The flow rate of sensor 700 is a function of MEMS pump 704 and rotation direction. The MEMS pump frequency changes as a function of positive or negative rotation. Hence, these sensors have two means of measuring flow, namely pump frequency and pump loading.

For pump loading systems the output voltage is a function of flow rate. For linear systems the output voltage (or current) would change as the rotation rate changes. For a constant flow rate, the pump uses just enough energy to maintain a constant flow, or angular rate. As the flow changes, so does the energy used.

Current hydrodynamic systems utilize a dielectric liquid (instead of distilled water) to measure the dynamic flow of the liquid. The construction of the sensor involves the integration of a transducer into a flow channel that detects that specific dielectric liquid. Hence, there is a dependence on that specific liquid. Embodiments herein can use the current hydrodynamic systems or the simple, low cost MEMS, pump or flow control motor in a MEMS channel as described above using a liquid, like water or butane, that satisfies the minimum flow rate required for detection. It can be integrated into an already existing flow system (such as a fuel cell) where any liquid is present (including coolant).

Dedicated check valves can be incorporated into the design to feed other subsystems as needed (the MEMS gyro pump can always be active if it is going to be used in this manner).

Regardless of the type of technology used, embodiments herein concentrate on the measurement of angle for the application of dead reckoning or inertial navigation and further use three independent sensors, namely an angle sensor (such as a magnetic field sensor), an angular acceleration sensor, and an angular velocity sensor (where the angular acceleration or angular velocity sensors can use a MEMS gyroscope or a hydro-MEMS design to make measurements). The embodiments herein further combine the readings of these sensors in a manner that minimizes errors inherent to their nature. In the process of combining their signals, errors that are caused by non-angular motion (like external stimulus) are managed and reduced and also further reduce their noise level (by the inclusion of more than one signal in the process of producing an angular output).

Figure 8:
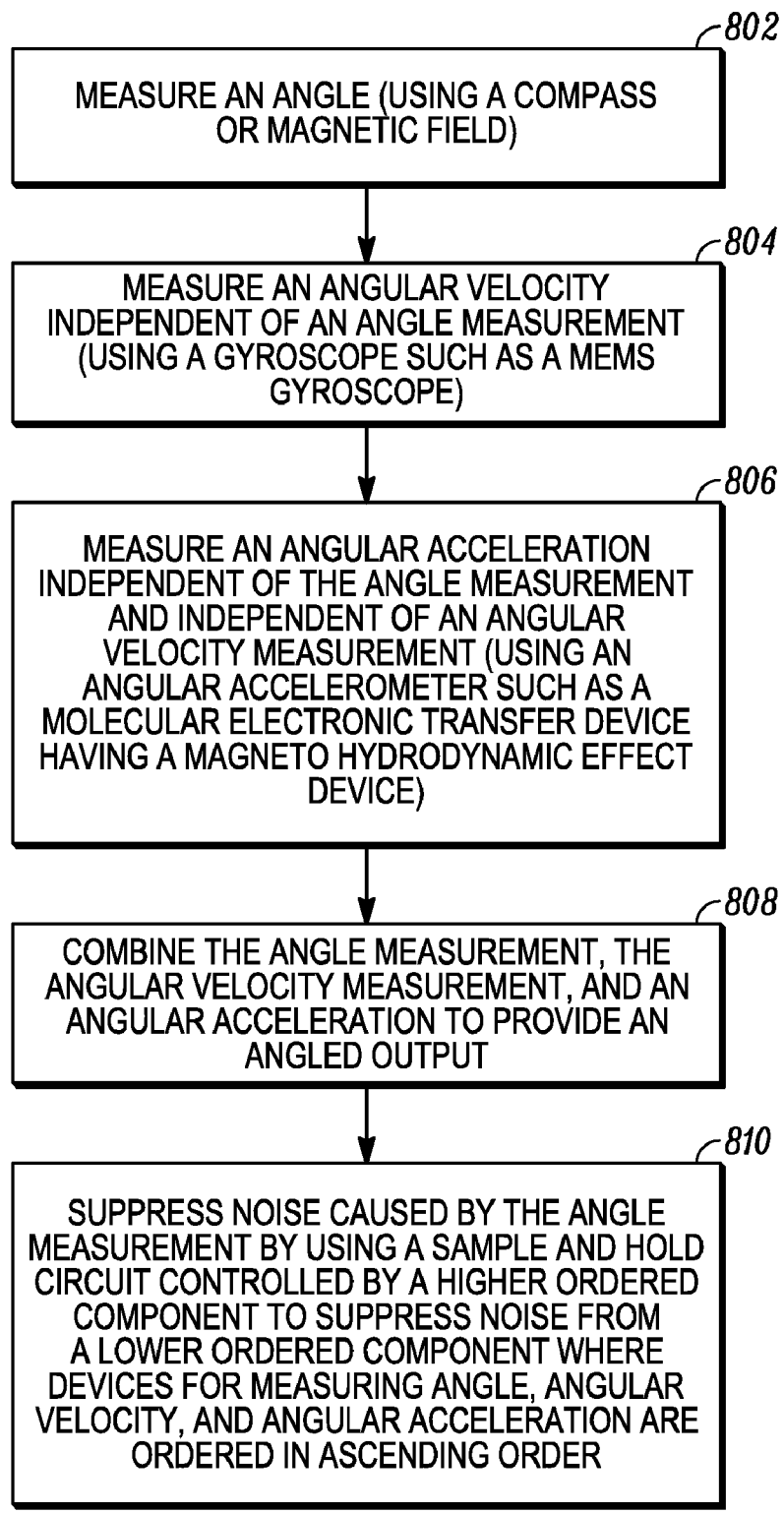
FIG. 8 is a flow chart illustrating a method of using context vectors in location applications in accordance with an embodiment of the present invention

Referring to FIG. 8, a flow chart illustrating a method 800 of personal inertial navigation measurements in accordance with the present invention can include the step 802 of measuring an angle, measuring an angular velocity independent of an angle measurement at step 804, measuring an angular acceleration independent of the angle measurement and independent of an angular velocity measurement at step 806, and combining the angle measurement, the angular velocity measurement, and an angular acceleration to provide an angled output at step 808. The angle measurement can be measured using a compass or magnetic field, the angular velocity can be measured using a gyroscope (such as a MEMS gyroscope), and the angular acceleration measurement can be measured using an angular accelerometer (such as a molecular electronic transfer device having a magneto hydrodynamic effect device). The method 800 can further include the step 810 of suppressing noise caused by the angle measurement by using a sample and hold circuit controlled by a higher ordered component to suppress noise from a lower ordered component where devices for measuring angle, angular velocity, and angular acceleration are ordered in ascending order.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of personal inertial navigation measurements, comprising the steps of:
   measuring an angle;
   measuring an angular velocity independent of an angle measurement;
   measuring an angular acceleration independent of the angle measurement and independent of an angular velocity measurement;
   combining the angle measurement, the angular velocity measurement, and an angular acceleration to provide an angled output for use in an inertial navigation device; and suppressing noise caused by the angle measurement using a higher ordered component to suppress noise from a lower ordered component where devices for measuring angle, angular velocity, and angular acceleration are ordered in ascending order, wherein the step of suppressing noise is done by using a sample and hold circuit.

2. The method of claim 1, wherein the angle measurement is measured using a compass, the angular velocity is measured using a gyroscope, and the angular acceleration measurement is measured using an angular accelerometer.

3. The method of claim 1, wherein the method measures the angular acceleration using a molecular electronic transfer device.

4. The method of claim 3, wherein the method measures the angular acceleration using the molecular electronic transfer device having a magneto hydrodynamic effect device.

5. A personal inertial navigation device, comprising:
   an angle measuring device for measuring an angle;
   an angular velocity measuring device for measuring angular velocity; and
   an angular acceleration measuring device for measuring angular acceleration, wherein the angular acceleration measuring device comprises an electrochemical motion sensor transducer in a housing having an electrolyte channel, and a MEMS pump wherein the MEMS pump is designed to pump electrolyte fluid at a constant flow rate and the measure of angular acceleration is based on energy used by the MEMS pump required to maintain the electrolyte fluid at the constant flow rate; and
   a combiner for combining the angle measurement, the angular velocity, and an angular acceleration to provide an angled output for use in an inertial navigation device.

6. The personal inertial navigation device of claim 5, wherein the angle, the angular velocity, and the angular acceleration are each independently measured.

7. The personal inertial navigation device of claim 5, wherein the angle measuring device comprises a compass, the angular velocity measuring device comprises a gyroscope.

8. The personal inertial navigation device of claim 5, wherein the electrochemical motion sensor comprises a molecular electronic transfer device including mesh anodes and cathodes separated by microporous spacers formed in the electrolyte channel of the housing, wherein the motion of the electrolyte fluid within the electrolyte channel is measured using convective diffusion of ions in the electrolyte fluid.

9. The personal inertial navigation device of claim 5, wherein the angular acceleration measuring device comprises a molecular electronic transfer device having a magneto hydrodynamic effect device.

10. The personal inertial navigation device of claim 5, wherein the personal inertial navigation device further comprises a noise suppressor for suppressing noise caused by the angular velocity measuring device.

11. A personal inertial navigation device, comprising:
    an angle measuring device for measuring an angle;
    an angular velocity measuring device for measuring angular velocity; and
    an angular acceleration measuring device for measuring angular acceleration,
    an output of the angular velocity measuring device is controlled by a sample and hold circuit using the angular acceleration measuring device to suppress noise caused by the angular velocity measuring device; and
    a combiner for combining the angle measurement, the angular velocity, and an angular acceleration to provide an angled output for use in an inertial navigation device.

12. An electronic device including a device for personal inertial navigation measurements, comprising:
    a plurality of sensors including a sensors for measuring angles, angular velocity, and angular acceleration; and
    a processor coupled to the plurality of motion sensors, wherein the processor is programmed to:
    measure an angle;
    measure an angular velocity independent of an angle measurement;
    measure an angular acceleration independent of the angle measurement and independent of an angular velocity measurement;
    wherein the processor is further programmed to suppress noise caused by the angular velocity measuring device by controlling an output of the angular velocity measuring device with a sample and hold circuit using an output of the angular acceleration sensor as an input to the sample and hold circuit; and combine the angle measurement, the angular velocity measurement, and an angular acceleration to provide an angled output to the electronic device.

13. The electronic device of claim 12, wherein the electronic device further comprises a transceiver coupled to the processor.

14. The electronic device of claim 12, wherein the electronic device further comprises a summing device that combines the angle measurement component, angular velocity measurement, and an angular acceleration measurement.

15. The electronic device of claim 12, wherein the sensor for measuring angles is a compass, the sensor for measuring angular velocity is a gyroscope, and the sensor for measuring angular acceleration is an angular accelerometer using a molecular electronic transfer device.

* * * * *